United States Patent [19]

Kapoor

[11] Patent Number: 5,757,367
[45] Date of Patent: May 26, 1998

[54] NUMBERING SCHEME FOR DYNAMIC ERROR ENCODING AND METHOD THEREFORE

[75] Inventor: Vijay Kapoor, Phoenix, Ariz.

[73] Assignee: Motorola, Inc., Schaumburg, Ill.

[21] Appl. No.: 597,671

[22] Filed: Feb. 6, 1996

[51] Int. Cl.⁶ ........................................................ H04L 5/16
[52] U.S. Cl. ............................ 375/219; 375/295; 375/340
[58] Field of Search .................................. 370/465, 468, 370/316, 317; 375/219, 224, 295, 316, 259, 340, 377

[56] References Cited

U.S. PATENT DOCUMENTS 5,673,266  9/1997  Li ................................................ 370/465

*Primary Examiner*—Tesfaldet Bocure
*Attorney, Agent, or Firm*—Walter W. Nielsen

[57] ABSTRACT

A communication system operates on a fixed-length data string (339) and utilizes fixed-length frames (200) to transmit data. Variable noise on a transmission path (105) requires adaptive encoding to sustain effective communication. An adaptive encoding type (201) produces variable length codes (205). Variable length codes (205) are accommodated by segmenting a fixed-length data string (339) into data groups. A data group (204) plus a code (205) occupy a fixed-length frame (200). At a transceiver node (150), the data groups (204) are ordered and concatenated to form the fixed-length data string (339).

20 Claims, 3 Drawing Sheets

| 201 | 202 | 203 | 204 | 205 |
|---|---|---|---|---|
| ENCODING TYPE | SEQUENCE NUMBER | SUBSEQUENCE NUMBER | DATA | CODE |

200

206 (covers DATA and CODE)

1
NUMBERING SCHEME FOR DYNAMIC ERROR ENCODING AND METHOD THEREFORE

FIELD OF THE INVENTION

The present invention relates generally to fixed frame length communication protocols, and in particular, to a frame numbering scheme for information encoding that adapts to prevailing error conditions.

BACKGROUND OF THE INVENTION

Many communication protocols utilize fixed-length frames to send blocks of information from a source to a destination. Each frame includes a sequence number and encoded information. The information is encoded to achieve reliable communication over a noisy transmission channel. Sequence numbers are used in a multipath communication system to reorder frames at the destination.

Under varying noise conditions, it is desirable to adapt the encoding method to the error conditions on a transmission channel; as noise increases, a more robust encoding method reduces the number of errors in the received information. A more robust encoding method requires more code per block of information. As a result, a block of encoded information that fits into one frame using a less robust encoding method, requires multiple frames using a more robust encoding method.

In order to accommodate these extra frames, current systems reset the communication link and then change the frame numbering scheme. Resetting the link requires waiting for the current frames in the system to reach the destination before sending the frames with the new numbering scheme. As a result, bandwidth is wasted.

Thus, what is needed is an extended frame numbering scheme that can work with the existing protocol, thus allowing the encoding method to be changed during information transmission without resetting the communication link.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

2
DETAILED DESCRIPTION OF A PREFERRED EMBODIMENT

Generally, the present invention provides a frame numbering method that enables fixed-length data frames to accommodate adaptive data encoding. The present invention has utility in enabling a communication system to accommodate extra encoding during transmission of data over noisy channels. The present invention can be more fully understood with reference to the figures.

Figure 1:
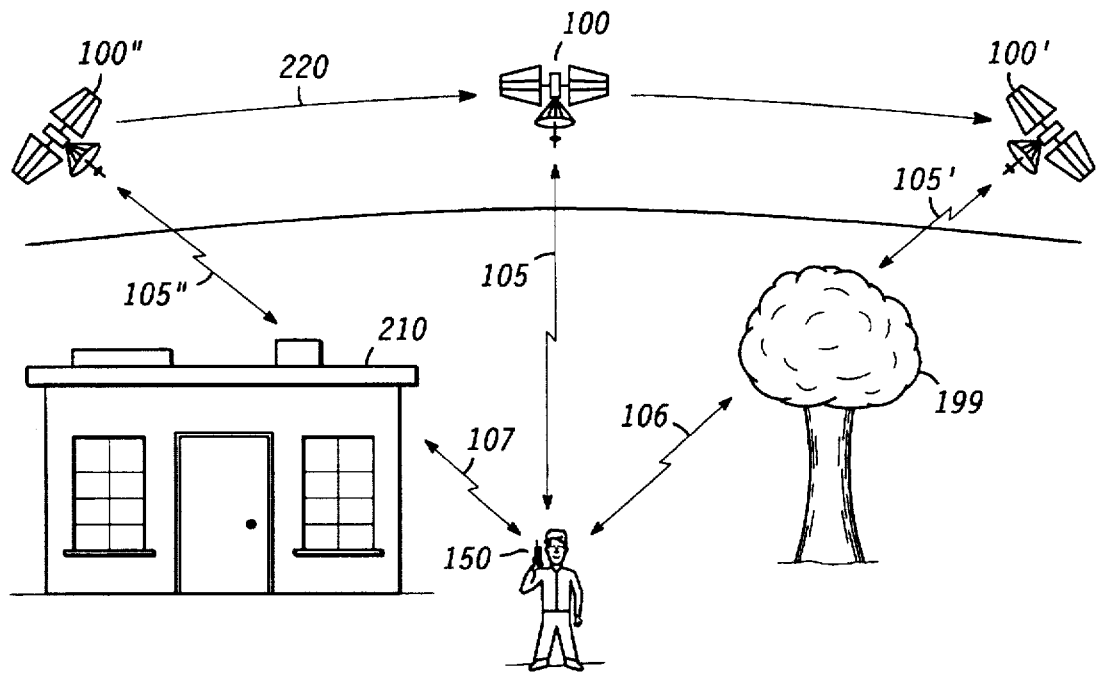
FIG. 1 is a highly simplified diagram of a communication system with varying levels of noise along transmission paths and within which the present invention may be practiced.

FIG. 1 is a highly simplified diagram of a communication system with varying levels of noise along the transmission paths and within which the present invention may be practiced. A transceiver node 100 and a transceiver node 150 act as transmitters and receivers and communicate with one another. Transceiver node 100 moves with respect to transceiver node 150 along path 220, and transceiver node 100 is shown in three different locations.

When transceiver node 100 acts as a transmitter, in a first location, transceiver node 100 transmits a data signal to transceiver node 150 along a transmission path 105. Transmission path 105, as shown, may be unobstructed. In a second location, transceiver node 100' transmits a data signal to transceiver node 150 along a transmission path 105'. Transmission path 105', as shown, may be obstructed by a tree 199. The attenuated data signal continues along a transmission path 106. In a third location, transceiver node 100" transmits a data signal to transceiver node 150 along a transmission path 105". Transmission path 105", as shown, may be obstructed by a building 210. The attenuated data signal continues along a transmission path 107.

The received data signal at transceiver node 150 may have been attenuated or may contain interfering noise due to propagation along the transmission path. Of the three transmission paths shown, transmission path 105 contains the least amount of noise and thus has the best link quality, transmission path 106 contains an intermediate amount of noise and thus has an intermediate link quality, and transmission path 107 contains the greatest amount of noise and thus has the worst link quality.

When transceiver node 150 acts as a transmitter, transceiver node 150 transmits a data signal along transmission paths 105, 106, and 107. Depending on the location of transceiver node 100, the data signal received by transceiver node 100 is more noisy or less noisy. Transmission path 105 is unobstructed, and the data signal received by transceiver node 100 contains the least amount of noise. Transmission path 106 is obstructed by tree 199, and the data signal received by transceiver node 100' along transmission path 105' contains an intermediate amount of noise. Transmission path 107 is obstructed by building 210, and the data signal received by transceiver node 100" along transmission path 105" contains the greatest amount of noise.

FIG. 1 illustrates one set of conditions in which varying noise levels can occur. However, varying levels of noise along the transmission path can be caused by a multitude of conditions; for example, movement of either transceiver with respect to the other, or movement of both transceivers. Also, a high level of ambient noise can create variable noise levels even without physical obstructions along the transmission path or movement of either transceiver. The present invention can be used in any environment with variable noise levels.

Figure 2:
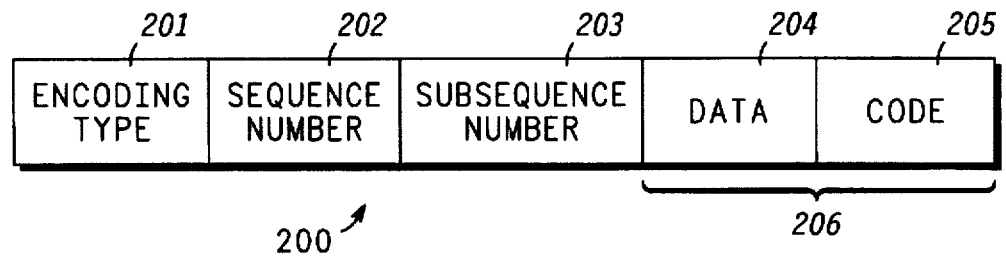
FIG. 2 depicts a fixed-length data frame format using extended frame numbering to continuously communicate data with adaptive encoding in accordance with a preferred embodiment of the present invention.

FIG. 2 depicts a fixed-length data frame format using extended frame numbering to continuously communicate data with adaptive encoding in accordance with a preferred embodiment of the present invention. The data signal transmitted along transmission paths 105, 105', 105", 106, and 107 in FIG. 1 is transmitted in fixed-length frames 200. The data signal is transmitted in a data group 204 in each fixed-length frame 200. Fixed-length frames 200 are transmitted sequentially; a sequence number 202 and a subsequence number 203 identify the sequential order of the fixed-length frames 200. An encoding type 201 identifies the type of encoding used to encode the data group 204 in the fixed-length frame 200. Encoding data group 204 results in a code 205. Data group 204 and code 205 form an encoded data group 206.

Encoding type 201 varies with the noise conditions along transmission paths 105, 105', 105", 106, and 107 in FIG. 1. A more robust encoding type 201 is used along a noisier transmission path, such as transmission path 107 when transceiver node 100" transmits a data signal to transceiver node 150 as shown in FIG. 1. A more robust encoding type 201 results in a longer code 205 for data group 204. Because fixed-length frame 200 is fixed in length, a longer code 205 requires a shorter data group 204. Thus, a more robust encoding type 201 requires that the data signal be broken up into smaller data groups 204.

The longest data group 204 that fixed-length frame 200 can accommodate occurs under low noise conditions when a shorter code 205 results from encoding the data group 204 using the least robust encoding type 201. The size of the longest data group 204 that fixed-length frame 200 can accommodate corresponds to the size of the fixed-length data string that the communication system is designed to operate on. Under noisier conditions, the data group 204 contained in a fixed-length frame 200 under low noise conditions is segmented into smaller data groups 204 to accommodate the longer codes 205 that result from the more robust encoding type 201.

Thus, the extended frame numbering scheme numbers the fixed-length frames 200 to allow assembling at the receiver of smaller data groups 204 into fixed-length data string 339 for operation by the communication system. The extended frame numbering scheme increments sequence number 202 for each fixed-length data string 339 and increments the subsequence number 203 for each of data groups 204 that comprise the fixed-length data string 339.

Therefore, under low noise conditions, the fixed-length frames 200 are numbered consecutively using the sequence numbers 202, while the subsequence numbers 203 remain unchanged, for example, at zero. Under noisier conditions, the fixed-length frames 200 containing the smaller data groups 204 comprising the fixed-length data string 339 are numbered with the same sequence number 202 and a consecutively numbered subsequence number 203. In this way, the smaller data groups 204 are regrouped and concatenated at the receiver to form the fixed-length data string 339 which was contained in the fixed-length frame 200 under low noise conditions and which was segmented to accommodate a more robust encoding type 201.

FIG. 2 illustrates one possible ordering of the encoding type 201, sequence number 202, subsequence number 203, data group 204, and code 205. However, these elements may occur in any order within fixed-length frame 200 as long as the same order is used at transceiver nodes 100 and 150 in FIG. 1.

Figure 3:
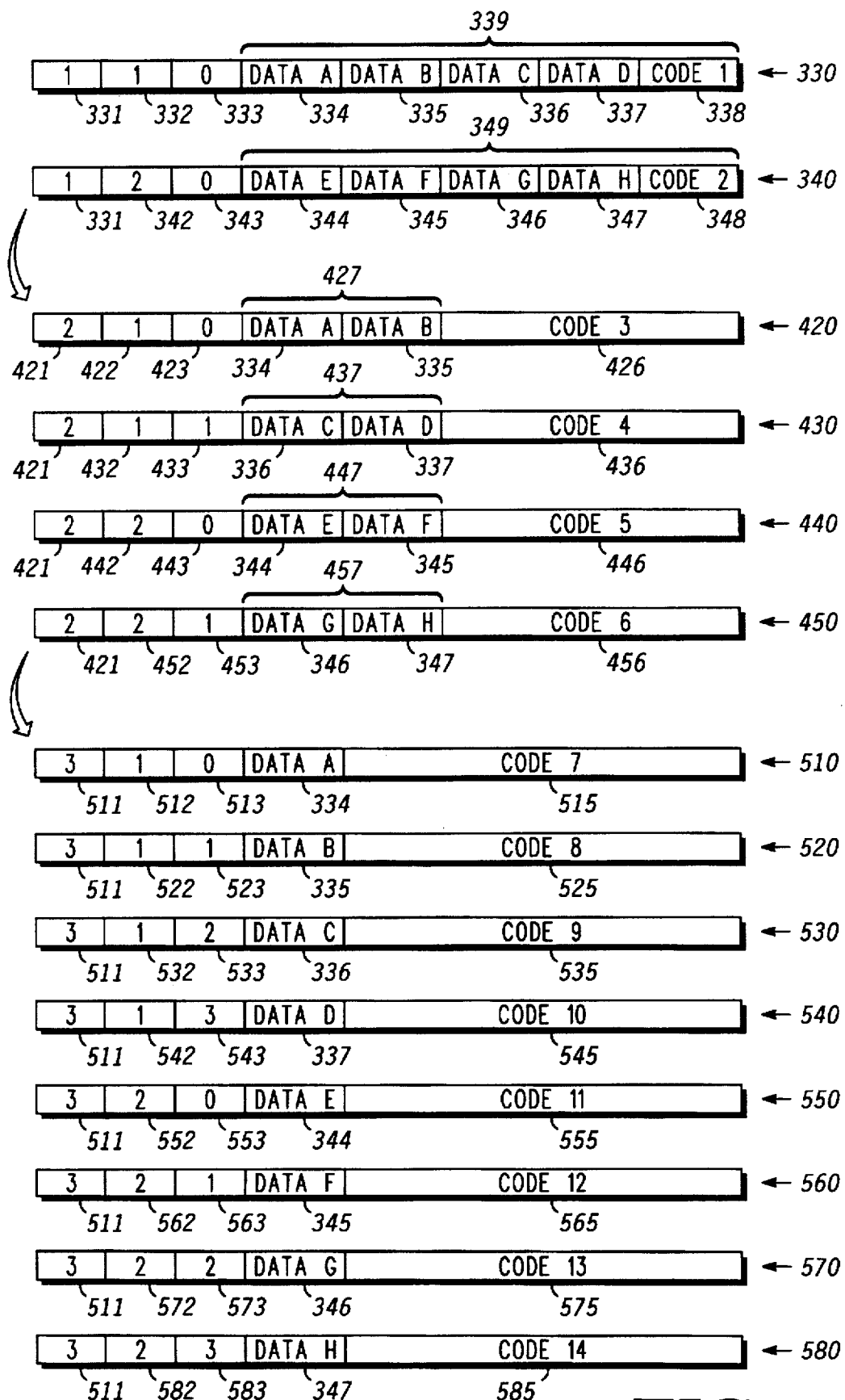
FIG. 3 is a data format flowchart depicting a process of using extended frame numbering of fixed-length frames to continuously communicate data with adaptive encoding in accordance with a preferred embodiment of the present invention.

FIG. 3 depicts an extended frame numbering used to continuously communicate data with adaptive encoding in accordance with a preferred embodiment of the present invention. The data is communicated using the fixed-length data frame format represented in FIG. 2.

When transmitting data in low noise conditions, such as along transmission path 105 in FIG. 1, each fixed-length data string 339 and 349 is transmitted in fixed-length frames 330 and 340. Each fixed-length data string 339 and 349 may consist of several data messages. Fixed-length data string 339 consists of data groups dataA 334, dataB 335, dataC 336 and dataD 337. Fixed-length data string 349 consists of data groups dataE 344, dataF 345, dataG 346 and dataH 347.

Encoding type 331 represents the encoding used under low noise conditions and is illustrated by number or type one. Encoding the fixed-length data string 339 results in code1 338. Using the low noise encoding type 331, the fixed-length data string 339 and code1 338 occupy one fixed-length frame 330. Encoding the fixed-length data string 349 results in code2 348. Using the low noise encoding type 331, the fixed-length data string 349 and code2 348 occupy one fixed-length frame 340.

Fixed-length frames 330 and 340 are transmitted sequentially with fixed-length frame 330 transmitted first. Fixed-length frames 330 and 340 are numbered in order to put fixed-length frames 330 and 340 in the proper sequence at the receiver. In the preferred embodiment, because the entire fixed-length data string 339 is contained in one fixed-length frame 330, fixed-length frame 330 is assigned a sequence number 332 of one and a subsequence number 333 of zero. Because the next fixed-length data string 349 is contained in one fixed-length frame 340, fixed-length frame 340 is assigned a sequence number 342 of two and a subsequence number 343 of zero.

When transmitting data in intermediate noise conditions, such as along transmission path 106 in FIG. 1 when transceiver node 100' transmits a data signal to transceiver node 150, intermediate noise encoding type 421 results in longer codes than low noise encoding type 331. Thus, the fixed-length data string 339 is segmented into data groups 427 and 437. Data groups 427 and 437 are transmitted in fixed-length frames 420 and 430, respectively. The fixed-length data string 349 is segmented into data groups 447 and 457. Data groups 447 and 457 are transmitted in fixed-length frames 440 and 450, respectively.

In the preferred embodiment, encoding type 421 represents the encoding used under intermediate noise conditions and is illustrated by the number two. Encoding the data group 427 results in code3 426. Using the intermediate noise encoding type 421, the data group 427 and code3 426 occupy one fixed-length frame 420. Encoding the data group 437 results in code4 436. Using the intermediate noise encoding type 421, the data group 437 and code4 436 occupy one fixed-length frame 430. Encoding the data group 447 results in code5 446. Using the intermediate noise encoding type 421, the data group 447 and code5 446 occupy one fixed-length frame 440. Encoding the data group 457 results in code6 456. Using the intermediate noise encoding type 421, the data group 457 and code6 456 occupy one fixed-length frame 450.

Fixed-length frames 420, 430, 440 and 450 are transmitted sequentially with fixed-length frame 420 transmitted first. The fixed-length frames 420, 430, 440 and 450 are numbered in order to put fixed-length frames 420, 430, 440, and 450 in the proper sequence at the receiver. Because the entire fixed-length data string 339 is contained in fixed-length frames 420 and 430, fixed-length frames 420 and 430 are assigned sequence numbers 422 and 432 of one and subsequence numbers 423 and 433 of zero and one, respectively. Because the next fixed-length data string 349 is contained in fixed-length frames 440 and 450, fixed-length frames 440 and 450 are assigned sequence numbers 442 and 452 of two and subsequence numbers 443 and 453 of zero and one, respectively.

When transmitting data in high noise conditions, such as along transmission path 107 in FIG. 1 when transceiver node 100" transmits a data signal to transceiver node 150, high noise encoding type 511 results in longer codes than low noise encoding type 331 and intermediate noise encoding type 421. Thus, the fixed-length data string 339 is segmented into data groups 334, 335, 336, and 337. Data groups 334, 335, 336, and 337 are transmitted in fixed-length frames 510, 520, 530, and 540, respectively. The fixed-length data string 349 is segmented into data groups 344, 345, 346, and 347. Data groups 344, 345, 346, and 347 are transmitted in fixed-length frames 550, 560, 570, and 580, respectively.

In the preferred embodiment, encoding type 511 represents the encoding used under high noise conditions and may be indicated by the number three. Encoding data group 334 results in code7 515. Using the high noise encoding type 511, the data group 334 and code7 515 occupy one fixed-length frame 510. Encoding the data group 335 results in code8 525. Using the high noise encoding type 511, the data group 335 and code8 525 occupy one fixed-length frame 520. Encoding the data group 336 results in code9 535. Using the high noise encoding type 511, the data group 336 and code9 535 occupy one fixed-length frame 530. Encoding the data group 337 results in code10 545. Using the high noise encoding type 511, the data group 337 and code10 545 occupy one fixed-length frame 540. Encoding the data group 344 results in code11 555. Using the high noise encoding type 511, the data group 344 and code11 555 occupy one fixed-length frame 550. Encoding data group 345 results in code12 565. Using the high noise encoding type 511, the data group 345 and code12 565 occupy one fixed-length frame 560. Encoding data group 346 results in code13 575. Using the high noise encoding type 511, the data group 346 and code13 575 occupy one fixed-length frame 570. Encoding data group 347 results in code14 585. Using the high noise encoding type 511, the data group 347 and code14 585 occupy one fixed-length frame 580.

Fixed-length frames 510, 520, 530, 540, 550, 560, 570, and 580 are transmitted sequentially with fixed-length frame 510 transmitted first. Fixed-length frames 510, 520, 530, 540, 550, 560, 570, and 580 are numbered in order to put the fixed-length frames 510, 520, 530, 540, 550, 560, 570, and 580 in the proper sequence at the receiver. Because the entire fixed-length data string 339 is contained in fixed-length frames 510, 520, 530, and 540, fixed-length frames 510, 520, 530, and 540 are assigned sequence numbers 512, 522, 532, and 542 of one and subsequence numbers 513, 523, 533, and 543 of zero, one, two, and three, respectively. In the preferred embodiment, because the next fixed-length data string 349 is contained in fixed-length frames 550, 560, 570, and 580, fixed-length frames 550, 560, 570, and 580 are assigned sequence numbers 552, 562, 572, and 582 of two and subsequence numbers 553, 563, 573, and 583 of zero, one, two, and three, respectively.

Figure 4:
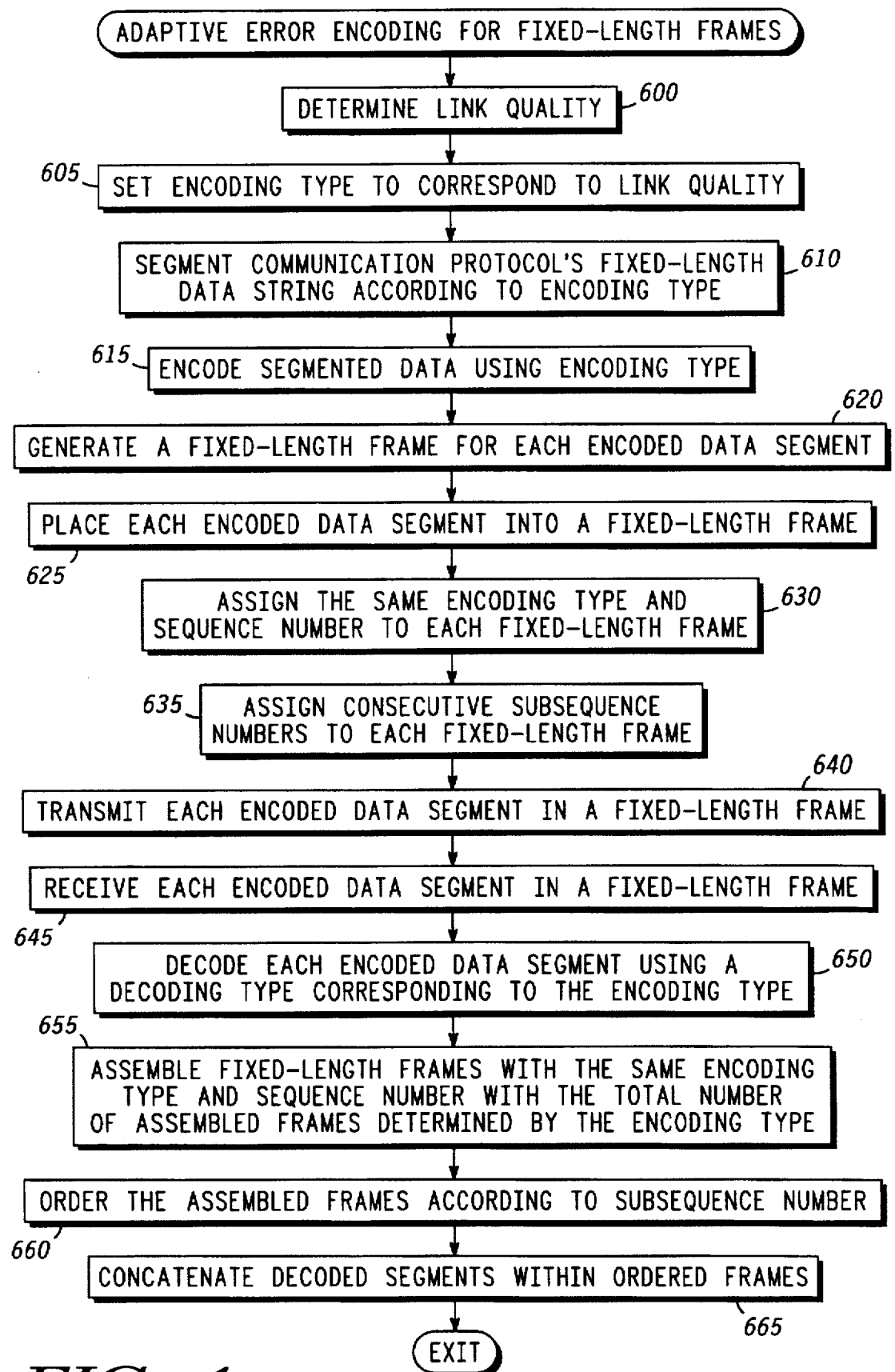
FIG. 4 shows a flowchart depicting a process of continuously communicating data in fixed-length frames using extended frame numbering to accommodate adaptive encoding, in accordance with a preferred embodiment of the present invention.

FIG. 4 shows a flowchart depicting a process of using extended frame numbering of fixed-length frames to continuously communicate data with adaptive encoding in accordance with a preferred embodiment of the present invention. A task 600 determines the link quality of the transmission path, for example transmission path 105 in FIG. 1. The link quality decreases as the noise level along the transmission path 105 increases.

A task 605 sets encoding type 201 (see FIG. 2) to correspond to the link quality. For example, a low noise encoding type 331 (see FIG. 3) is set under low noise conditions along transmission path 105 (see FIG. 1).

A task 610 segments the communication system's fixed-length data string 339 (see FIG. 3) into data groups 204 (see FIG. 2) in response to the encoding type 201 (see FIG. 2). A low noise encoding type 331 (see FIG. 3) results in a shorter code 338 (see FIG. 3). Therefore, the fixed-length data string 339 (see FIG. 3) is not segmented. An intermediate noise encoding type 421 (see FIG. 3) results in a longer code 426 (see FIG. 3). Therefore, fixed-length data string 339 (see FIG. 3) is segmented into data groups 427 and 437 (see FIG. 3).

A task 615 encodes data group 204 (see FIG. 2) using encoding type 201 (see FIG. 2). This results in a code 205 (see FIG. 2) and an encoded data group 206 (see FIG. 2).

A task 620 generates a fixed-length frame 200 (see FIG. 2) for each encoded data group 206 (see FIG. 2), and a task 625 places each encoded data group 206 (see FIG. 2) into fixed-length frame 200 (see FIG. 2).

A task 630 assigns encoding type 201 (see FIG. 2) and sequence number 202 (see FIG. 2) to each fixed-length frame 200 (see FIG. 2). For example, under intermediate noise conditions, encoding type 421 (see FIG. 3) is assigned to fixed-length frames 420 and 430 (see FIG. 3). Also, because fixed-length frames 420 and 430 (see FIG. 3) contain fixed-length data string 339 (see FIG. 3), fixed-length frames 420 and 430 (see FIG. 3) are assigned the same sequence number 422 and 432 (see FIG. 3).

A task 635 assigns the subsequence number 203 (see FIG. 2) to each fixed-length frame 200 (see FIG. 2). For example, under intermediate noise conditions, consecutive subsequence numbers 423 and 433 (see FIG. 3) are assigned to fixed-length frames 420 and 430 (see FIG. 3) containing fixed-length data string 339 (see FIG. 3).

A task 640 transmits each encoded data group 206 (see FIG. 2) in a fixed-length frame 200 (see FIG. 2). For example, fixed-length frame 200 (see FIG. 2) could be transmitted over transmission path 105 (see FIG. 1) from transceiver node 100 (see FIG. 1) to transceiver node 150 (see FIG. 1).

A task 645 receives each fixed-length frame 200 (see FIG. 2). For example, fixed-length frame 200 (see FIG. 2) could be received by transceiver node 150 (see FIG. 1) after transmission in task 640 by transceiver node 100 (see FIG. 1) over transmission path 105 (see FIG. 1).

A task 650 decodes each encoded data group 206 (see FIG. 2) in each received fixed-length frame 200 using a decoding type corresponding to encoding type 201 (see FIG. 2). Decoding encoded data group 206 (see FIG. 2) results in data group 204 (see FIG. 2).

A task 655 assembles received fixed-length frames 200 (see FIG. 2) with the same encoding type 201 (see FIG. 2) and the same sequence number 202 (see FIG. 2). The assembled fixed-length frames 200 (see FIG. 2) contain the fixed-length data string 204 (see FIG. 2). For example, in FIG. 3, under intermediate noise conditions, fixed-length data string 339 is contained in fixed-length frames 420 and 430. Fixed-length frames 420 and 430 are assembled because they have the same encoding type 421 and sequence number 422 and 432.

The number of fixed-length frames 200 (see FIG. 2) assembled is determined by the encoding type 201 (see FIG. 2) since encoding type 201 (see FIG. 2) determines the number of fixed-length frames 200 (see FIG. 2) that contain the fixed-length data string 339 (see FIG. 3). Thus, in FIG.

3. in the preferred embodiment, under low noise conditions, encoding type 331 results in assembling one fixed-length frame 330. Under intermediate noise conditions, encoding type 421 results in assembling fixed-length frames 420 and 430.

A task 660 orders the assembled fixed-length frames 200 (see FIG. 2) according to a subsequence number 203 (see FIG. 2). For example, in FIG. 3, under intermediate noise conditions, assembled fixed-length frames 420 and 430 are ordered with fixed-length frame 420 first because subsequence number 423 is lower than subsequence number 433.

A task 665 concatenates data groups 204 (see FIG. 2) within ordered fixed-length frames 200 (see FIG. 2). For example, in FIG. 3, under intermediate noise conditions, data groups 427 and 437 are concatenated to form fixed-length data string 339.

Figure 5:
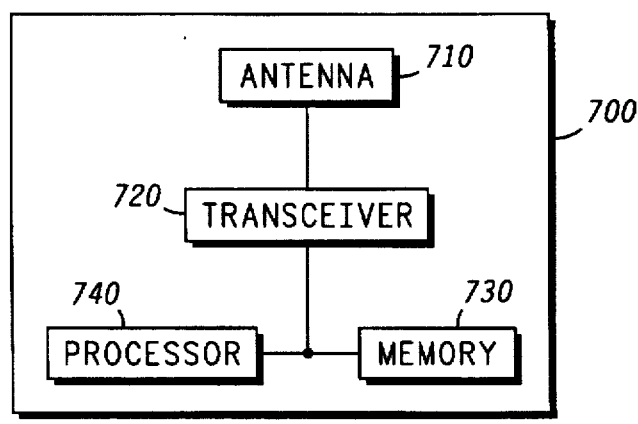
FIG. 5 shows a block diagram of a transceiver node in accordance with an embodiment of the present invention.

FIG. 5 shows a block diagram of a transceiver node in accordance with an embodiment of the present invention. Transceiver node 700 may be a transmitter or a receiver or a full-duplex transceiver capable of performing both transmit and receive functions. Transceiver node 700 is comprised of an antenna 710, a transceiver 720, a processor 740, and a memory 730.

A transceiver 720 transmits encoded data groups in each fixed-length frames. Transceiver 720 also receives encoded data groups in each of the fixed-length frames. Transceiver 720 is capable of timing and synchronization necessary to communicate within the communication system.

A processor 740 is operatively connected to transceiver 720 and performs extensive data evaluation, manipulation, encoding, and decoding operations on data. Processor 740 determines a link quality between a transmitter and a receiver in the communication system. A transceiver node may at one point in time assume the role of a transmitter and at another point in time assume the role of a receiver. Transceiver node 700 may also assume both roles simultaneously in a full-duplex mode of operation.

Processor 740 also may alter an encoding type 201 in response to the determined link quality and derives data groups from fixed-length data strings. Processor 740 may alter an encoding type 201 to specify increased encoding when the link quality decreases or may alter the encoding type to specify decreased encoding when the link quality increases. Processor 740 also performs the encoding and decoding, in conjunction with a memory 730, of a data group in response to an encoding type. Processor 740 also assembles the data groups into fixed-length data strings in response to sequence numbers and subsequence numbers. Collecting and ordering in response to subsequence numbers and the concatenating of these data groups is also carried out by processor 740.

In summary, the present invention provides a method for continuously communicating data in fixed-length frames using adaptive encoding. At the transmitter, the communication system's fixed-length data string is segmented to accommodate the various encoding types. A more robust encoding type requires a shorter data segment; thus, the data segment plus the longer code generated by the more robust encoding type will occupy a fixed-length frame. At the receiver, the encoded data segments are decoded and concatenated to form the fixed-length data string.

The present invention eliminates the need of resetting the communication system every time the encoding type is changed. The present invention has been described above with reference to preferred embodiments. However, those skilled in the art will recognize that changes and modifications may be made in these preferred embodiments without departing from the scope of the present invention. For example, heightened noise conditions on the transmission path may be caused by heightened ambient noise as opposed to physical obstructions. Others may devise alternate procedures to accomplish substantially the same functions as those described herein. These and other changes and modifications which are obvious to those skilled in the art are intended to be included within the scope of the present invention.

What is claimed is:

1. A method for transmitting data in fixed-length frames employing an adaptive encoding type in a communication system which operates on a fixed-length data string of said data wherein said data is transmitted continuously when said encoding type is altered, said method comprising the steps of:

determining a link quality between a transmitter and a receiver of said communication system;

altering said encoding type in response to said link quality;

deriving at least one data group from said fixed-length data string wherein a quantity of said at least one data group depends on said encoding type;

encoding said at least one data group into at least one encoded data group in response to said encoding type; and transmitting each of said at least one encoded data group in each of said fixed-length frames.

2. A method as recited in claim 1 wherein said altering step comprises the step of:

altering said encoding type to specify increased encoding when said link quality decreases; and altering said encoding type to specify decreased encoding when said link quality increases.

3. A method as recited in claim 1 wherein said deriving step comprises the steps of:

increasing said quantity when said encoding type specifies increased encoding; and decreasing said quantity when said encoding type specifies decreased encoding.

4. A method as recited in claim 1 wherein said transmitting step comprises the steps of:

generating one of said fixed-length frames for each of said at least one encoded data group;

placing each of said at least one encoded data group into each of said fixed-length frames;

assigning said encoding type to each of said fixed-length frames; and numbering each of said fixed-length frames.

5. A method as recited in claim 4 wherein said numbering step comprises the steps of:

assigning a sequence number to each of said fixed-length frames; and assigning a subsequence number to each of said fixed-length frames.

6. A method as recited in claim 5 wherein for said at least one data group derived from said fixed-length data string said assigning a sequence number step further comprises the step of:

assigning said sequence number to each of said fixed-length frames comprising one of said at least one encoded data group.

7. A method as recited in claim 5 wherein for said at least one data group derived from said fixed-length data string said assigning a subsequence number step further comprises the step of:

assigning a consecutive one of said subsequence number to each of said fixed-length frames comprising one of said at least one encoded data group.

8. A method for receiving data in fixed-length frames employing an adaptive encoding type in a communication system which operates on a fixed-length data string of said data wherein said data is received continuously when said encoding type is altered, said method comprising the steps of:

receiving each of at least one encoded data group in each of said fixed-length frames;

decoding said at least one encoded data group into at least one data group in response to said encoding type; and assembling said at least one data group into said fixed-length data string in response to a sequence number, a subsequence number, and said encoding type of each of said fixed-length frames.

9. A method as recited in claim 8 wherein said assembling step comprises the steps of:

collecting said fixed-length frames into a collection of at least one fixed-length frame in response to said sequence number and said encoding type;

ordering said collection of at least one fixed-length frame into an ordered collection of at least one fixed-length frame in response to said subsequence number; and concatenating each of said collection of at least one fixed-length frame within said ordered collection of at least one fixed-length frame to form said fixed-length data string.

10. A method as recited in claim 9 wherein said collecting step comprises the step of:

collecting said fixed-length frames with said sequence number and said encoding type into said collection of at least one fixed-length frame wherein a quantity of said at least one fixed-length frame depends on said encoding type.

11. A communication system for transmitting and receiving data in fixed-length frames employing an adaptive encoding type in a communication system which operates on a fixed-length data string of said data wherein said data is transmitted continuously when said encoding type is altered, said communication system comprising:

a transmitter for determining a link quality between nodes in said communication system, for altering said encoding type in response to said link quality, for deriving at least one data group from said fixed-length data string wherein a quantity of said at least one data group depends on said encoding type, for encoding said at least one data group into at least one encoded data group in response to said encoding type, and said transmitter for transmitting each of said at least one encoded data group in each of said fixed-length frames; and a receiver for receiving each of said at least one encoded data group in each of said fixed-length frames transmitted by said transmitter, for decoding said at least one encoded data group into at least one data group in response to said encoding type, and for assembling said at least one data group into said fixed-length data string in response to said encoding type of each of said fixed-length frames.

12. A communication system as recited in claim 11, wherein said transmitter further comprises:

a means for altering said encoding type to specify increased encoding when said link quality decreases; and a means for altering said encoding type to specify decreased encoding when said link quality increases.

13. A communication system as recited in claim 11, wherein said transmitter further comprises:

a means for increasing said quantity when said encoding type specifies increased encoding; and a means for decreasing said quantity when said encoding type specifies decreased encoding.

14. A communication system as recited in claim 11, wherein said transmitter further comprises:

a means for generating one of said fixed-length frames for each of said at least one encoded data group;

a means for placing each of said at least one encoded data group into each of said fixed-length frames;

a means for assigning said encoding type to each of said fixed-length frames; and a means for numbering each of said fixed-length frames.

15. A communication system as recited in claim 14, wherein said transmitter further comprises:

a means for assigning a sequence number to each of said fixed-length frames; and a means for assigning a subsequence number to each of said fixed-length frames.

16. A communication system as recited in claim 15, wherein said receiver further comprises:

a means for collecting said fixed-length frames into a collection of at least one fixed-length frame in response to said sequence number and said encoding type;

a means for ordering said collection of at least one fixed-length frame into an ordered collection of at least one fixed-length frame in response to said subsequence number; and a means for concatenating each of said collection of at least one fixed-length frame within said ordered collection of at least one fixed-length frame to form said fixed-length data string.

17. A transceiver node for transmitting and receiving data in fixed-length frames employing an adaptive encoding type in a communication system which operates on a fixed-length data string of said data wherein said data is transmitted continuously when said encoding type is altered, said communication system comprising:

a processor for determining a link quality in said communication system, for altering said encoding type in response to said link quality, for deriving at least one data group from said fixed-length data string wherein a quantity of said at least one data group depends on said encoding type, for encoding said at least one data group into at least one encoded data group in response to said encoding type, and following reception of said at least one encoded data group, decoding said at least one encoded data group into at least one data group in response to said encoding type, and assembling said at least one data group into said fixed-length data string; and a transceiver operatively coupled to said processor for transmitting each of said at least one encoded data group in each of said fixed-length frames, and for receiving each of at least one encoded data group in each of said fixed-length frames.

18. A transceiver node as recited in claim 17, wherein said processor further comprises:

a means for altering said encoding type to specify increased encoding when said link quality decreases;

a means for altering said encoding type to specify decreased encoding when said link quality increases;

a means for increasing said quantity when said encoding type specifies increased encoding; and a means for decreasing said quantity when said encoding type specifies decreased encoding.

19. A transceiver node as recited in claim 17, wherein said processor further comprises:

- a means for generating one of said fixed-length frames for each of said at least one encoded data group;
- a means for placing each of said at least one encoded data group into each of said fixed-length frames;
- a means for assigning said encoding type to each of said fixed-length frames;
- a means for numbering each of said fixed-length frames;
- a means for assigning a sequence number to each of said fixed-length frames; and
- a means for assigning a subsequence number to each of said fixed-length frames.

20. A transceiver node as recited in claim 19, wherein said processor further comprises:

- a means for collecting said fixed-length frames into a collection of at least one fixed-length frame in response to said sequence number and said encoding type;
- a means for ordering said collection of at least one fixed-length frame into an ordered collection of at least one fixed-length frame in response to said subsequence number; and
- a means for concatenating each of said collection of at least one fixed-length frame within said ordered collection of at least one fixed-length frame to form said fixed-length data string.

* * * * *